March 17, 1970 L. W. KOCH ET AL 3,500,959
ROTARY PARTICLE FILTER FOR A BEARING
Filed Feb. 27, 1968

INVENTORS
LUDWIG W. KOCH
DENNIS F. KELLER
BY *William J. Miller*
ATTORNEY

United States Patent Office 3,500,959
Patented Mar. 17, 1970

3,500,959
ROTARY PARTICLE FILTER FOR A BEARING
Ludwig W. Koch, Lakewood, Colo., and Dennis F. Keller, Ponca City, Okla., assignors to Continental Oil Company, Ponca City, Okla., a corporation of Delaware
Filed Feb. 27, 1968, Ser. No. 708,645
Int. Cl. F01m *1/00;* F16j *15/54;* F16c *1/24*
U.S. Cl. 184—6                                          6 Claims

ABSTRACT OF THE DISCLOSURE

A filter for the bearing of a flow meter which has a differential pressure is made by mounting a disc around the shaft over the high pressure side of the bearing in close proximity to the bearing. The disc should permit fluid to flow to the shaft and between the shaft and bearing to provide a lubricant. Rotation of the disc will throw the particles in the fluid away from the shaft, preventing the particles from entering the bearing and causing excessive wear.

DESCRIPTION OF THE PRIOR ART

Whenever flow meters are used for measuring slurries, which are liquids containing particles, the particles tend to enter the bearings of the flow meter, causing the bearings to fail in an extremely short period of time. In fact, under normal use, a standard flow meter would fail in 4 or 5 hours, necessitating disassembly of the flow meter and replacement of the bearing and/or shaft if the shaft was also too badly worn to provide adequate tolerances for the operation of the meter.

SUMMARY OF THE INVENTION

The present invention contemplates preventing the slurry from entering the bearing by placing a disc on the shaft on the high pressure side of the bearing. The disc, when rotated at a high speed, will cause the particles to be centrifugally propelled away from the inlet to the bearing; however, enough tolerance is maintained between the bottom of the disc and the top of the bearing to permit the liquid portion of the slurry to enter the bearing and provide lubrication therefor.

Therefore, it is an object of the present invention to provide a means of preventing slurry particles from entering a bearing.

It is also an object of the present invention to propel the particles away from the bearing and yet permit the liquid portion of the slurry to enter the bearing and provide lubrication therefor.

Other objects and advantages of the invention will be evident from the following detailed description when read in conjunction with the accompanying drawing which illustrates the invention.

DESCRIPTION OF THE PREFERRED EMBODIMENT

Figure 1:
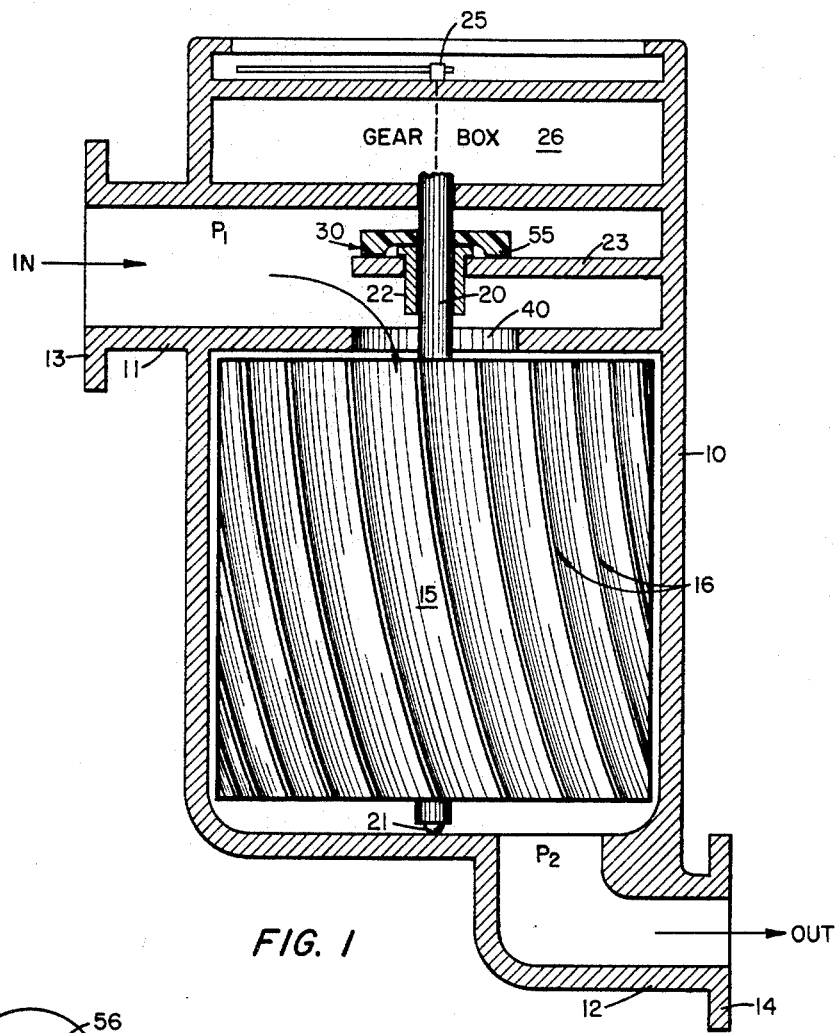
FIG. 1 is a cross sectional view of a slurry meter showing the impeller and shaft in full view.

Referring to all of the figures but in particular to FIG. 1 (similar numbers will be used for similar parts throughout all of the figures), a cross sectional view of a slurry meter is shown, having a casing 10 usually made of metal which may be noncorrosive, having an inlet pipe 11 and an outlet pipe 12. Each of these pipes has a mounting flange 13 and 14, respectively. Inside the slurry pump is an impeller 15 having a plurality of vanes 16 mounted spirally thereon. Through the axis of impeller 15 is a shaft 20 mounted in the bottom of casing 10 by a bearing 21 and at the top by a bearing 22. Bearing 22 is secured to the casing 10 by any satisfactory manner, such as support 23. Shaft 20 is mechanically connected to metering indicator 25 through a gear box 26 which for simplification of the drawing is not shown in detail. A disc filter 30 is mounted axially on the shaft 20 on the high pressure side of bearing 22.

OPERATION

Figure 2:
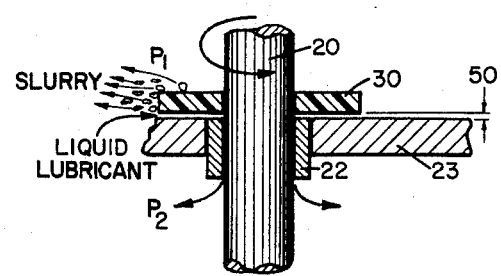
FIG. 2 is a cross sectional view of a portion of FIG. 1 showing the shaft in full view and illustrates the operation of this invention.

This invention is particularly applicable to the metering of slurries through a flow meter shown in FIG. 1. For the purpose of this invention, a slurry shall be defined as a liquid containing solid matter within the liquid which was added intentionally as one means of transporting the solid material; however, the invention would be just as applicable to any flow meter which meters liquid which contains solid particles unintentionally contained therein. Referring in particular to FIGURES 1 and 2, liquid entering the flow meter in the direction of the "IN" arrow will pass through inlet pipe 11 down through impeller 15, causing same to rotate, which in turn will cause shaft 20 to turn. The shaft rotation will be transmitted through gear box 26 to indicator 25. After passing through impeller 15, the material will enter outlet pipe 12 and leave the flow meter in the direction of the "OUT" arrow. Liquid entering the flow meter will of course have a higher pressure, labeled "P–1," than the pressure as it leaves the flow meter, labeled "P–2." The differential pressure $(P-1-P-2) = \Delta P$ will not only exist across the flow meter but also across any incremental distance along the flow meter from the inlet 11 to the outlet 12. Thus, normally the liquids in the flow meter will pass through bearing 22 since a $\Delta P$ will exist across the length of the bearing 22, and to the impeller, as well as going directly to the impeller through opening 40. Bearing 22 will therefore have continuous lubrication by the liquid passing through the bearing; however, the liquid may also contain particles. As previously mentioned, these particles may either be unintentionally in the liquid or, in the case of a slurry, intentionally added. As the particles and liquid flow through the bearing 22, the shaft and bearing will begin to wear. In order to prevent the particles from entering the bearing, particularly where a normal slurry may contain 53% by weight of solid material, a disc 30 is mounted axially on the shaft in such a way as to provide a very small clearance 50 (see FIG. 2) between disc 30 and bearing 22. The distance 50 is gauged to be of a size sufficient to permit liquid to enter the bearing, but small enough to prevent harmful particles from entering along with the liquid lubricant.

In the preferred embodiment, disc 30 is made of a resin of the polyester class of which nylon is an example. Other resins that will work satisfactorily are polyvinylchloride (PVC) and polyvinylfluoride (Teflon). Other suitable material can be used such as other plastics or resins and metals and metal alloys. Disc 30 is approximately 1" in diameter and has an axial opening therethrough which is slightly smaller than the diameter of the shaft. The disc is then forced over the shaft and down to the bearing, leaving a slight clearance 50. When the shaft was rotated, the particles shown in FIG. 2, which are in the slurry, are propelled away from the disc 30 by centrifugal force preventing excessive wear of the shaft 20 and bearing 22. In a flow meter modified in accordance with this invention prior to the inclusion of disc 30, in a slurry containing 53% by weight of coke particles, the flow meter lasted approximately 4 to 5 hours. After disc 30 was added, in accordance with the method described above, the flow meter operated over 400 hours without requiring any maintenance whatsoever. In fact, the flow meter was still operating when the tests were completed.

MODIFICATION OF THE PREFERRED EMBODIMENT

Figure 3A:
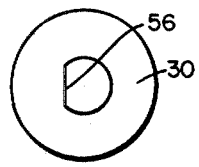
FIG. 3a and 3b show various modifications of the filter disc shown in FIGURES 1 and 2.
Figure 3B:
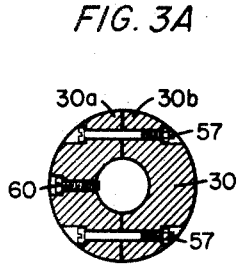

Several modifications of the disc 30 can be incorporated. For example, when bearing 22 has a mounting flange such as that shown in FIG. 1, a lip 55 can be added so that additional filtering can be obtained; otherwise the disc could be no bigger than the top surface area of bearing 22. Several methods can be used to mount disc 30 on the shaft where the disc cannot be pressed on the shaft; as previously explained, a flat 56 (see FIG. 3a) can be used. Also the disc can be divided into two portions, 30a and 30b, as shown in FIG. 3b. The halves can be secured together by any suitable means, such as screws 57. Also in lieu of a flat 56, a set screw 60 can be used.

Changes may be made in the combination and arrangement of elements as heretofore set forth in this specification and shown in the drawing; it being understood that changes may be made in the embodiments disclosed without departing from the spirit and scope of the invention.

What is claimed is:

1. In combination with a fluid system having a high pressure side and a low pressure side, a bearing communicating between said sides and a shaft journaled in said bearing, said combination additionally including a disc having an opening axially therethrough mounted to said shaft through said opening and positioned adjacent said bearing on its high pressure side and having a clearance between said bearing and said disc sufficient to permit the passage of lubricant therebetween, said clearance further being close enough to prevent entry of destructive abrasive particles whereby lubricant will pass by said disc and freely enter said bearing and particles attempting to pass through said clearance will be caught by said disc and propelled away from said bearing by centrifugal force.

2. A disc as described in claim 1 having a cup shape with the lip in near engagement with the housing on the high pressure side of said bearing.

3. A disc as described in claim 1 wherein said disc is made of a resin.

4. A disc as described in claim 1 wherein said disc is made of metal.

5. A disc as described in claim 3 having a cup shape with the lip in near engagement with the housing on the high pressure side of said bearing.

6. In a fluid operated device having a housing, a shaft journaled in said housing by at least one bearing, said bearing having an inlet side, a fluid inlet and an outlet to said housing, a bearing protection device comprising a disc having an axial opening therethrough, means for mounting said disc axially on said shaft on the inlet side of said bearing such that the surface of said disc is spaced from said bearing by an amount equal to or less than the clearance distance between said shaft and said bearing.

References Cited
UNITED STATES PATENTS

| | | | |
|---|---|---|---|
| 1,867,260 | 7/1932 | Grandjean | 277—133 |
| 2,140,356 | 12/1938 | Gutmann | 308—36.4 |
| 2,188,856 | 1/1940 | Chieritz | 277—133 |

FRED C. MATTERN, Jr., Primary Examiner

M. A. ANTONAKAS, Assistant Examiner

U.S. Cl. X.R.

277—133; 308—36.4